(12) United States Patent
Leeder et al.

(10) Patent No.: US 10,690,004 B2
(45) Date of Patent: Jun. 23, 2020

(54) AIRCRAFT TURBOMACHINE ASSEMBLY HAVING AN IMPROVED DECOUPLING SYSTEM IN THE EVENT OF A FAN BLADE LOSS

(71) Applicant: SAFRAN AIRCRAFT ENGINES, Paris (FR)

(72) Inventors: Laurent Leeder, Saint Germain les Corbeil (FR); Arnaud Bessy, Courlon sur Yonne (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 60 days.

(21) Appl. No.: 15/984,948

(22) Filed: May 21, 2018

(65) Prior Publication Data
US 2018/0334923 A1    Nov. 22, 2018

(30) Foreign Application Priority Data

May 22, 2017    (FR) ...................................... 17 54541

(51) Int. Cl.
*F01D 21/04*    (2006.01)
*F01D 25/16*    (2006.01)
(Continued)

(52) U.S. Cl.
CPC ........... *F01D 21/045* (2013.01); *F01D 21/08* (2013.01); *F01D 25/162* (2013.01); *F02C 7/06* (2013.01);
(Continued)

(58) Field of Classification Search
CPC .. F01D 21/045; F01D 25/162; F01D 2220/36; F01D 260/30; F04D 29/059;
(Continued)

(56) References Cited

U.S. PATENT DOCUMENTS 1,009,586 A * 11/1911 Schmidt ................ F16C 23/084
384/488
1,492,672 A * 5/1924 Brunner ................ F16C 23/084
384/498
(Continued)

FOREIGN PATENT DOCUMENTS

CA          2356766 A1 *  3/2002  ........... F01D 21/045
EP       1 013 896 A2     6/2000
(Continued)

OTHER PUBLICATIONS

French Preliminary Search Report dated Feb. 2, 2018 in French Application 17 54541 filed on May 22, 2017 (with English Translation of Categories of Cited Documents).

*Primary Examiner* — J. Todd Newton
(74) *Attorney, Agent, or Firm* — Oblon, McClelland, Maier & Neustadt, L.L.P.

(57) ABSTRACT

An assembly for a turbomachine includes a fan rotor drive shaft, a rolling element and a support of an exterior rolling-element bearing ring including an exterior annular element as well as an interior annular element coupled through a decoupling interface in the shape of a truncated sphere and configured to be retained by friction under normal operating conditions of the turbomachine, and to move with respect to one another in the event of a fan blade loss. The rolling-element bearing is designed so that each rolling element has four points of contact with the rings, and so that the interface between the ring and the support has a hollowed space for deformation routed around a central portion of the exterior ring.

10 Claims, 4 Drawing Sheets

(51) Int. Cl.
*F01D 21/08* (2006.01)
*F02C 7/06* (2006.01)
*F16C 23/08* (2006.01)
*F16C 33/58* (2006.01)
*F16C 19/52* (2006.01)
*F04D 29/059* (2006.01)
*F16C 33/60* (2006.01)
*F16C 35/077* (2006.01)
*F16C 19/16* (2006.01)

(52) U.S. Cl.
CPC ........... *F04D 29/059* (2013.01); *F16C 19/52* (2013.01); *F16C 23/084* (2013.01); *F16C 33/581* (2013.01); *F05D 2220/36* (2013.01); *F05D 2240/54* (2013.01); *F05D 2250/241* (2013.01); *F05D 2260/30* (2013.01); *F16C 19/166* (2013.01); *F16C 33/60* (2013.01); *F16C 35/077* (2013.01); *F16C 2226/60* (2013.01); *F16C 2326/43* (2013.01); *F16C 2360/23* (2013.01)

(58) Field of Classification Search
CPC ............. F05D 2220/36; F05D 2260/30; F05D 2240/54; F05D 2250/241; F05D 2220/33; F16C 19/52; F16C 2326/43; F16C 35/077; F16C 19/166; F16C 33/60; F16C 2226/60; F16C 23/084; F16C 33/581; F16C 2360/33; F05B 2260/30; F05B 2220/33; F02C 7/06
USPC .......................................................... 415/2.1
See application file for complete search history.

(56) References Cited

U.S. PATENT DOCUMENTS

| | | | | |
|---|---|---|---|---|
| 2,975,007 A * | 3/1961 | Zwicker | ................ | F16C 19/06 384/498 |
| 3,224,821 A * | 12/1965 | Barr | ................ | F16C 13/02 384/484 |
| 3,727,998 A * | 4/1973 | Haworth | ................ | F01D 21/045 384/99 |
| 6,152,604 A * | 11/2000 | Ostling | ................ | F16C 35/073 384/478 |
| 6,331,078 B1 * | 12/2001 | Van Duyn | ................ | F01D 21/04 384/498 |
| 7,097,413 B2 * | 8/2006 | VanDuyn | ................ | F01D 21/08 415/142 |
| 7,625,128 B2 * | 12/2009 | Gillespie | ................ | F01D 25/162 384/535 |
| 7,909,514 B2 * | 3/2011 | Plona | ................ | F01D 21/045 384/499 |
| 8,152,438 B2 * | 4/2012 | Servant | ................ | F01D 25/162 403/12 |
| 8,821,029 B2 * | 9/2014 | Antunes | ................ | F01D 25/166 384/624 |
| 9,869,205 B2 * | 1/2018 | Ganiger | ................ | F01D 25/162 |
| 9,909,451 B2 * | 3/2018 | Carter | ................ | F16C 35/073 |
| 10,196,934 B2 * | 2/2019 | Khan | ................ | F01D 25/164 |
| 10,323,541 B2 * | 6/2019 | Ganiger | ................ | F01D 25/164 |
| 2002/0081047 A1 * | 6/2002 | Zoppitelli | ................ | F16C 23/084 384/495 |
| 2003/0210979 A1 * | 11/2003 | Doerflein | ................ | F01D 21/045 415/1 |
| 2007/0031078 A1 * | 2/2007 | Hackett | ................ | F01D 25/164 384/535 |
| 2009/0269202 A1 * | 10/2009 | Borzakian | ................ | F01D 5/027 416/220 R |
| 2009/0285674 A1 * | 11/2009 | Mollmann | ................ | F01D 21/045 415/170.1 |
| 2013/0163911 A1 * | 6/2013 | Antunes | ................ | F01D 25/162 384/498 |
| 2016/0369652 A1 * | 12/2016 | Morris | ................ | F01D 25/18 |
| 2018/0112672 A1 * | 4/2018 | Ganiger | ................ | F02K 3/06 |

FOREIGN PATENT DOCUMENTS

| | | |
|---|---|---|
| FR | 2 752 024 A1 | 2/1998 |
| FR | 2 888 621 A1 | 1/2007 |
| FR | 2 966 208 A1 | 4/2012 |
| FR | 3 003 913 A1 | 10/2014 |
| JP | 2006-125626 | 5/2006 |
| JP | 2006-336683 | 12/2006 |

* cited by examiner

AIRCRAFT TURBOMACHINE ASSEMBLY HAVING AN IMPROVED DECOUPLING SYSTEM IN THE EVENT OF A FAN BLADE LOSS

TECHNICAL FIELD

The present invention relates to the field of aircraft engines with fan(s), and more particularly to means implemented within these engines to deal with the imbalance cause by the loss of a fan blade ("fan blade out" condition). This problem is dealt with in particular in documents FR 2 752 024, FR 2 888 621 and FR 2 966 208.

The invention applies in particular to turbojets.

PRIOR ART

Referring to FIG. 1, the front portion of an aircraft turbojet 1 is shown schematically, with a design known from the prior art. The turbojet 1 has a longitudinal axis 2 on which are centered a fan rotor 4 bearing fan blades 6, as well as a drive shaft 8 integral in rotation with the rotor 4.

The turbojet 1 also includes a casing/stator 10 forming a fixed rigid shell, this casing being shown very schematically in FIG. 1. To ensure the retention and the guidance of the shaft 8, three rolling-element bearings are provided, spaced from one another along the axis 2, these bearings having respectively the reference symbols, from front to rear, 12a, 12b and 12c.

The exterior ring of each of these three bearings is attached to the casing 10 by connecting means with the respective reference symbols 14a, 14b and 14c. These means are conventional rolling-element bearing supports, forming an annular structure connecting the exterior ring directly to the casing, or to an internal extension of the latter, as is the case for the front rolling-element bearing 12a situated closest to the rotor 4.

The foremost rolling-element bearing 12a and the rearmost rolling-element bearing 12c are each provided to take up radial forces, while the intermediate bearing 12b is also provided to ensure the axial retention of the shaft 8.

As regards the front rolling-element bearing 12a, its bearing support 14a is connected to the casing 10 by a fusible mechanical connection 16a. This connection is for example accomplished using screws, the number, the dimensioning and the position of which are selected so as to be able to confer the desired fusible character, which will be explained hereafter.

Under normal operating conditions of the turbojet, the latter assumes a conventional configuration as shown schematically in FIG. 1. In this configuration, the fusible mechanical connection 16a is sufficiently strong to support the radial forces transmitted by the front bearing 12a, serving to maintain the rotation of the shaft 8 along the longitudinal axis 2 of the turbojet.

In an exceptional problem case leading to the loss of one or more fan blades 6, the rotor 4 is subjected to a strong imbalance which causes very high radial forces in the structures of the turbojet, and in particular in the bearing supports 14a, 14b and 14c and in the casing 10.

As was previously mentioned, the fusible mechanical connection 16a is designed to break when the support 14a is subjected to extremely high radial forces, of a predeterminable level. Referring to FIG. 2, the quasi-immediate consequence of these ruptures consists of the radial movement of the rotor 4. The drive shaft 8, which continues to be retained at the axis 2 by the intermediate rolling-element bearing 12b and by the rear rolling-element bearing 12c, follows the movement of the rotor by undergoing bending. A connecting housing 18 is interposed between the shaft 8 and the intermediate rolling-element bearing 12b. It is capable of transforming itself into a ball and socket joint following the rupture of a fusible mechanical, as will be explained with reference to FIG. 3. This housing 18 comprises essentially a ball and socket joint 24 which is held in a blocked state under normal operating conditions during flight. To accomplish this, the housing 18 includes on the one hand an annular interior structure 26 attached to the drive shaft 8 and having a spherical span, and on the other hand an exterior annular structure 28, fixed with respect to an interior ring of the intermediate rolling-element bearing 12b. This exterior structure 28 delimits a track with a complementary shape to that of the spherical span, so as to jointly form said ball and socket joint. Conventionally, the exterior structure 28 has the shape of a disk of which the internal end is radially supported on the interior structure 26, by means of a contact between the spherical span and the complementary-shaped track, which are tightly fitted.

In addition, to retain the ball-and-socket joint in the blocked state, fusible pins 30 are provided between the interior and exterior structures of the housing 18. After rupture of these pins 30 caused by a strong imbalance causing flexure of the shaft 8 and a strong decoupling moment in the housing, the flexure of the shaft becomes healthier and the risks of destruction of the turbojet are consequently strong reduced.

The design of this solution remains complex, however, in particular as regards its decoupling housing and the surrounding elements. In fact, the implementation of shear pins makes assembly, as well as machining operations, more complex. In addition, it is necessary to provide means for clamping the interior ring of the intermediate rolling-element bearing to the disk 28, as well as means for clamping the interior annular structure 26 to the drive shaft 8. The multiplicity of these clamping means complicates the assembly and generates fitting constraints. Finally, particular coatings are usually required at the elements 26, 28 forming the ball-and-socket joint of the housing 18.

DISCLOSURE OF THE INVENTION

The invention therefore has as its goal to remedy at least partially the disadvantages mentioned above in connection with prior art developments.

To this end, the invention has first of all as its object an assembly for an aircraft turbomachine comprising:

a fan rotor drive shaft;

a rolling-element bearing comprising an exterior ring, an interior ring, and rolling elements arranged between the exterior and interior rings;

means for connecting the interior rolling-element bearing ring to the drive shaft;

an exterior rolling-element bearing ring support, said support being designed to be attached to a stator element of the turbomachine, and comprising an interior radial bearing surface in contact with an exterior radial surface of the exterior ring, the interior and exterior radial surfaces defining a junction interface between the exterior ring and its support.

According to the invention, said exterior ring support includes an exterior annular element as well as an interior annular element coupled to the exterior element via a decoupling interface in the shape of a truncated sphere, the exterior and interior annular elements being configured to be retained with respect to one another by friction at their decoupling interface under normal operating conditions of the turbomachine, and to move, with respect to one another, in the event of a fan blade loss, under the influence of a decoupling moment originating in the drive shaft and transmitted by the rolling-element bearing which is designed so that each rolling element has two points of contact with the exterior ring and two points of contact with the interior ring, and so that said junction interface has, under normal operating conditions of the turbomachine, a hollowed space for deformation routed around a central portion of the exterior ring.

The proposed design breaks with prior technology aiming to provide a decoupling housing interposed between the interior rolling-element bearing ring, and the fan rotor drive shaft. In fact, the invention provides for offsetting the mechanical decoupling zone outside the rolling-element bearing, because it is currently integrated into the support of the exterior ring of this rolling-element bearing. The decoupling interface which results has a greatly increased surface area which makes it possible, under normal operating conditions, to ensure mechanical coupling purely by friction between the interior and exterior elements forming this interface. Likewise during mechanical decoupling, the energy dissipated in the ring support to overcome the friction forces is high, which leads to a reduction of risks of rupture of the surrounding elements such as the drive shaft or even the connecting means between the interior rolling element bearing ring and the same shaft.

With the invention, the use of fusible pins is then no longer required, which simplifies manufacture as well as assembly operations. It is in fact the entire arrangement situated between the shaft and the interior rolling-element bearing ring which can be simplified with respect to the developments of the prior art.

In addition, to guarantee the transmission of the decoupling moment to the interior annular element of the exterior ring support, the invention provides for a rolling-element bearing with increased angular stiffness in the case of a fan blade loss. In fact, this stiffness increases due to the separation of the two points of contact between each rolling element and the track of the exterior rolling-element bearing ring. This separation of the two points is observed thanks to the deformation of the exterior ring, made possible by the hollowed space inside which it is capable of closing, by behaving in the manner of two portions which would pivot with respect to the central portion.

Furthermore, the invention has at least any one of the following optional features, taken in isolation or in combination.

Said means for connecting the interior rolling-element bearing ring to the drive shaft are accomplished contiguously with the interior ring of the rolling element bearing. As a result, the junction between the shaft and the rolling-element bearing is advantageously simplified in the extreme, which facilitates assembly operations.

The external rolling-element bearing ring is preferably split axially into two adjoining rings. This facilitates the closure effect of the exterior ring, encountered during strong radial loads following a fan blade loss. Nevertheless, the exterior ring could be made in a single part, without departing from the scope of the invention.

The exterior radial surface of the exterior ring comprises at its center a notch having a half-section in the shape of a V radially open toward the exterior, delimiting a portion of said hollowed space. Alternatively or simultaneously, such a notch can be provided on the interior annular element of the support, this notch then preferably having a half-section in the shape of a V radially open toward the exterior.

Preferably, the exterior radial surface of each of the two rings has a chamfer, and the two chamfers face one another so as to jointly form said notch.

Said support is equipped with means of detecting the position of the interior annular element with respect to the exterior annular element. Here these detection means are easy to install, due to the accessible character of the support of the exterior rolling-element bearing ring.

Preferably, the rolling elements are balls.

The invention also has as its object an aircraft gas turbine, preferably a turbojet, comprising at least one such assembly.

The turbomachine preferably includes three rolling-element bearings for guiding the fan rotor drive shaft, said rolling-element bearing of the assembly constituting an intermediate rolling-element bearing situated between the two others.

Finally, the fan rotor drive shaft is a low-pressure shaft.

Other advantages and features of the invention will appear in the detailed non-limiting description below.

BRIEF DESCRIPTION OF THE DRAWINGS

This description will be made with reference to the appended drawings, among which.

DETAILED DESCRIPTION OF THE PREFERRED EMBODIMENTS

Figure 1:
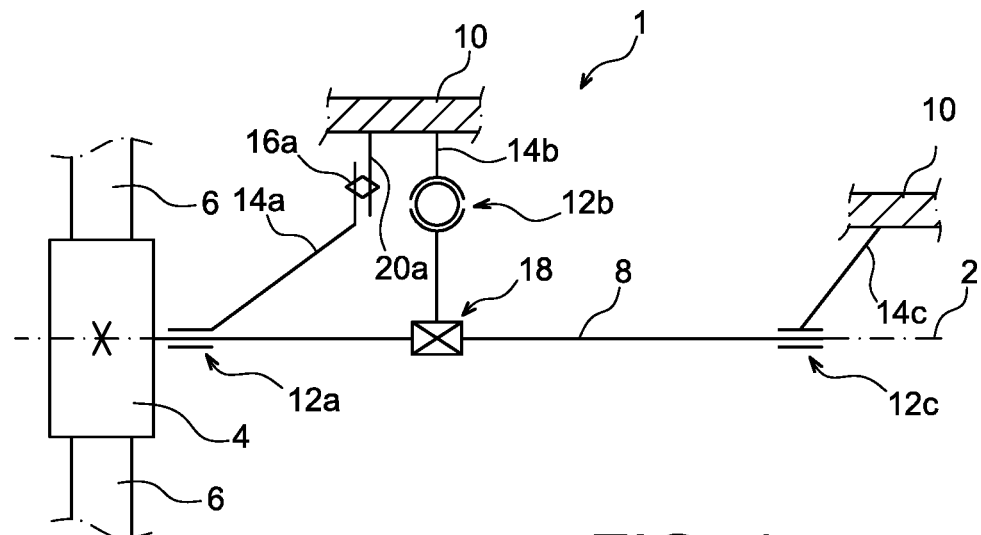
FIG. 1 shows a schematic view in longitudinal section of a portion of a turbojet, according to a design known from the prior art.
Figure 2:
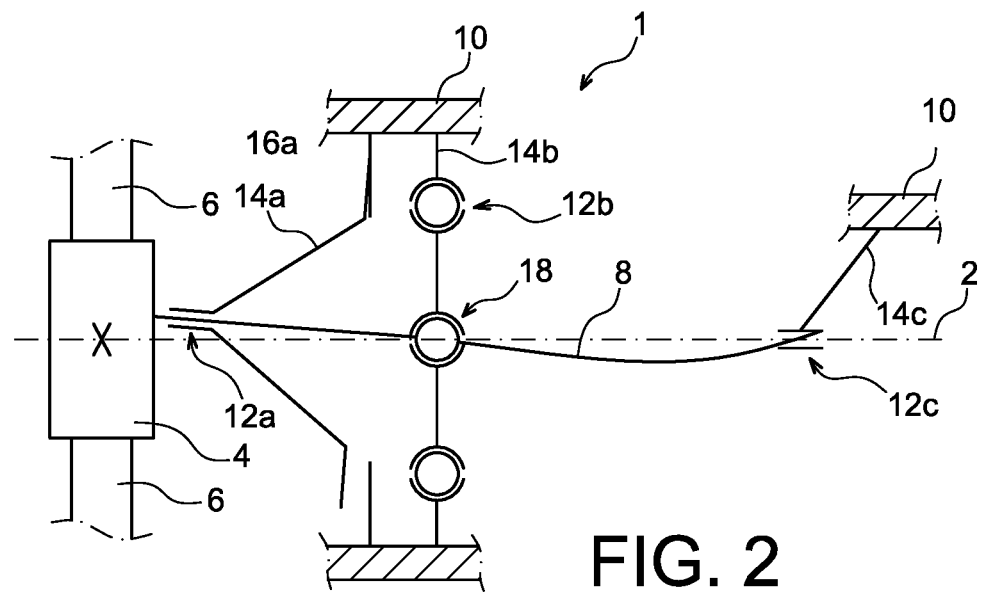
FIG. 2 shows a view similar to that of FIG. 1, with the turbojet in a configuration as assumed after the mechanical decoupling of the front rolling-element bearing, after the loss of a fan blade.
Figure 3:
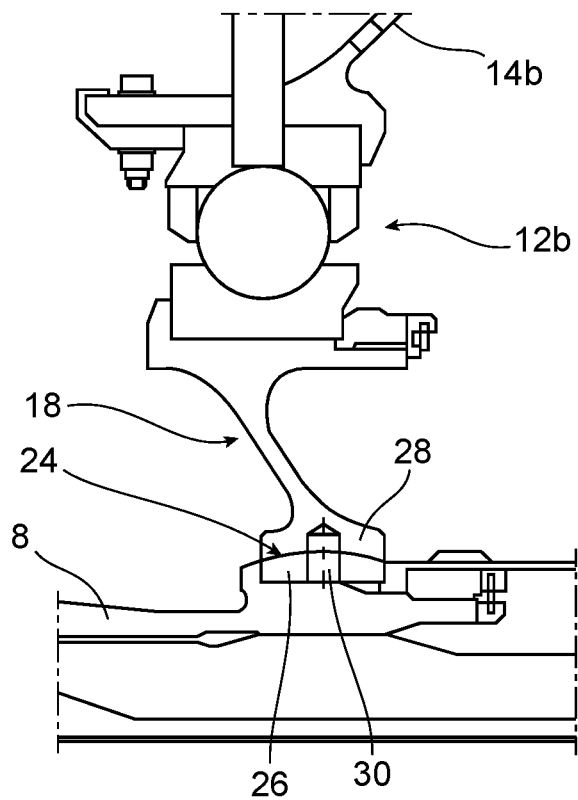
FIG. 3 shows a more detailed half-section view of a connection housing interposed between the fan drive shaft 8 and the intermediate rolling-element bearing of the turbojet shown in the preceding figures.
Figure 4:
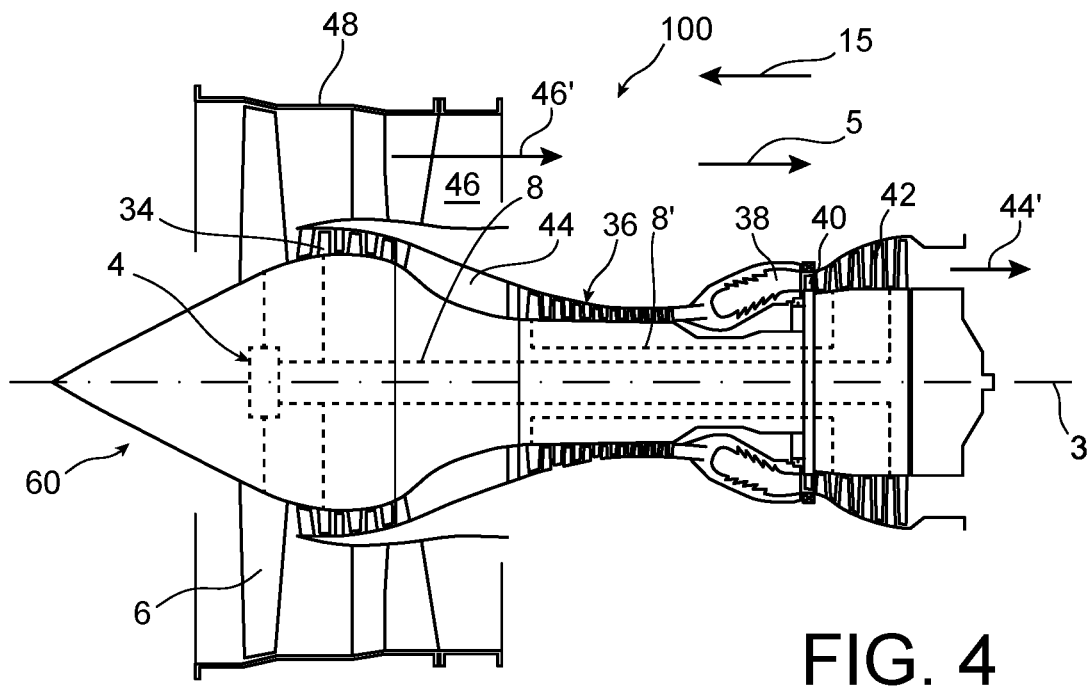
FIG. 4 is a schematic view of a turbojet according to the invention.

With reference to FIG. 4, an aircraft turbomachine 100 according to the invention is shown. This is a double flow two-spool turbojet. Nevertheless, it could be any other turbomachine with a fan disposed upstream or downstream of the gas generator, without departing from the scope of the invention.

The turbojet 100 has a longitudinal axis 2 around which extend its different components. It comprises, from upstream to downstream along a principal direction 5 of gas flow through this turbojet, the fan rotor 4 bearing the fan blades 6, a low-pressure compressor 34, a high-pressure compressor 36, a combustion chamber 38, a high-pressure turbine 40 and a low-pressure turbine 42. These elements delimit a primary stream 44 through which a primary flow 44' passes, while a secondary stream 46 surrounds the primary stream, being partially delimited from it by a fan casing 48 with a secondary air flow 46' passing through it.

In the description that follows, the terms "front" and "rear" are considered according to a direction 15 opposite to the principal direction 5 of gas flow within the turbojet, and parallel to the axis 2. In addition, the terms "upstream" and "downstream" are considered according to this same principal flow direction 5.

Figure 5:
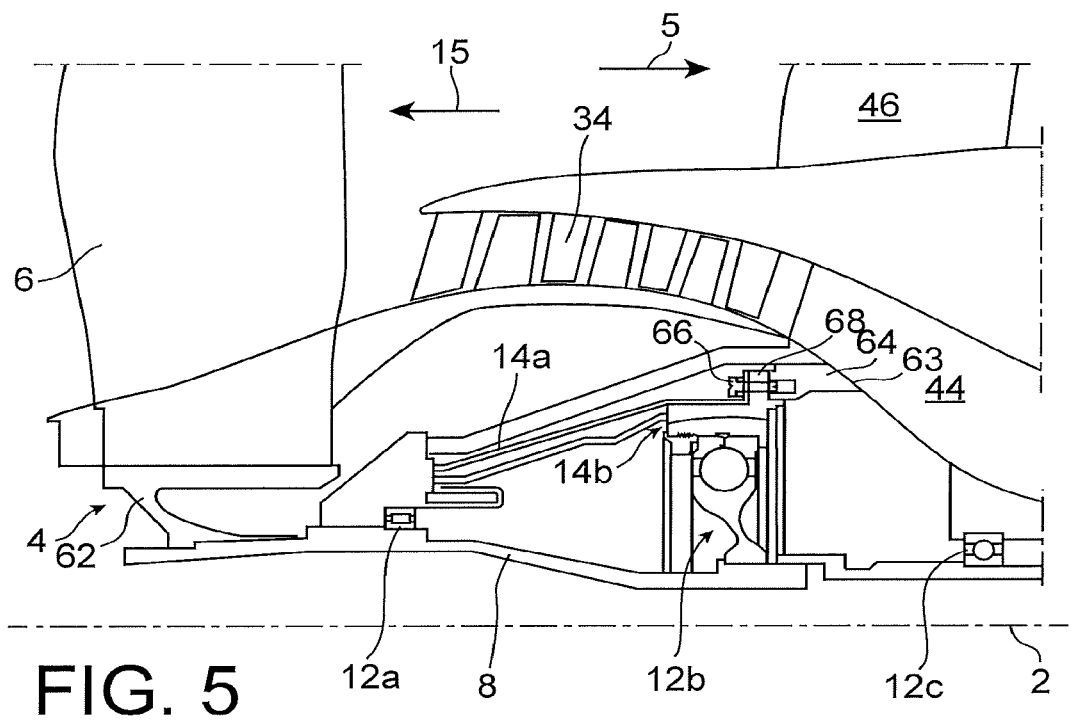
FIG. 5 is an enlarged half-section view of a portion of the turbojet shown in the preceding figure.

The low-pressure compressor 34 and the low-pressure turbine 42 are connected by a low-pressure shaft 8, also corresponding to the fan rotor 4 drive shaft, while the high-pressure compressor 36 and the high-pressure turbine 40 are connected by a high-pressure shaft 8' coaxial with the low-pressure shaft 8. The invention is integrated into a front portion 60 of the turbojet, which will currently be described in reference to FIGS. 5 and 6.

The front portion 60 includes here three rolling-element bearings for guiding the drive shaft 8. These are first of all the front rolling-element bearing 12a situated in proximity to a fan hub 62 arranged in proximity to the front end of the drive shaft 8 which drives it in rotation along the axis 2. Next is the intermediate rolling element bearing 12b situated facing radially a rear end of the low-pressure compressor 34, and finally the rear rolling-element bearing 12c situated between the low-pressure and high-pressure compressors. The front rolling-element bearing 12a is connected to a stator element 63 of the turbojet with by the rolling-element bearing support 14a which extends toward the rear and radially toward the exterior. The stator element 63 is the internal delimitation wall of the primary stream 44, which has a structural extension 64 on which is fixed the support 14a, via the calibrated screws 66. The screws 66 thus form the fusible connection 16a previously described. The intermediate rolling-element bearing 12b is connected to the same extension 64 by means of the support 14b, which has a flange 68 through which the calibrated screws 66 also pass.

The intermediate rolling-element bearing 12b is an integral part here of an assembly 70 specific to the invention, which comprises furthermore the shaft 8, the support 14b and means 77 of connecting the interior ring of the rolling-element bearing to the shaft 8.

Within this assembly 70, the rolling-element bearing 12b includes an exterior ring 72, an interior ring 74 as well as rolling elements 76 in the shape of balls. To facilitate manufacturing and assembly, the interior ring 74 and the connecting means 77 are made in a single part of which the upper end forms an interior rolling track for the balls 76, and of which the interior end is a bore cooperating with a portion of the shaft 8. Axial clamping means 80 allow the attachment of the single disk-shaped part to the drive shaft 8.

Here, the support 14b has the characteristic of being made in two distinct portions, respectively constituted by an exterior annular element 82 and an interior annular element 84. The two elements 82, 84 are coupled to one another via a decoupling interface 86 in the shape of a truncated sphere. The center of this sphere is situated on the axis 2 of the assembly 70. The interior annular element 84 includes an interior radial support surface 88 receiving and being in contact with an exterior radial surface 90 of the exterior rolling-element bearing ring. These two surfaces 88, 90 together form a junction surface 89 between the exterior rolling-element bearing ring 72 and the support 14b. A clamping ring 92 makes it possible to ensure the axial clamping of the exterior ring 72 of the rolling-element bearing against a collar 94 of the interior annular element 84 of the support 14b.

In this preferred embodiment, the exterior ring 72 is split into two axially adjoining rings. These two rings have the reference symbols 96 and 98. They are preferably joined together at a transverse plane passing substantially diametrically through the balls 76.

The rolling-element bearing 12b is configured so that under normal operating conditions of the turbojet, each ball 76 has two points of contact 101, 102 with the interior ring 74, as well as two points of contact 103, 104 with respectively the two rings 96, 98 forming the exterior ring 72. The presence of these four contact points allows reinforcement of the angular stiffness of the rolling-element bearing 12b, by an embedding effect. It is the shape of the rolling tracks defined by the rings which leads to obtaining these four points of contact with the balls 76.

Another characteristic of the invention resides in the presence of a hollowed space 106 which is routed continuously around a central portion 73 of the exterior ring of the rolling-element bearing. This hollowed space 106, which can be observed at the junction interface 89 at least under normal operating conditions of the turbojet, is made so as to form a deformation zone of the exterior ring 72, as will be explained hereafter. In the preferred embodiment shown, the exterior radial surface 90 of the ring 72 has at its center a half-section shaped like a V radially open toward the exterior. It is this notch which forms all or a part of the hollowed space 106. It is accomplished using two axially facing chamfers 108, 110, respectively provided on the exterior radial surface 90 of the two rings 96, 98.

Figure 6:
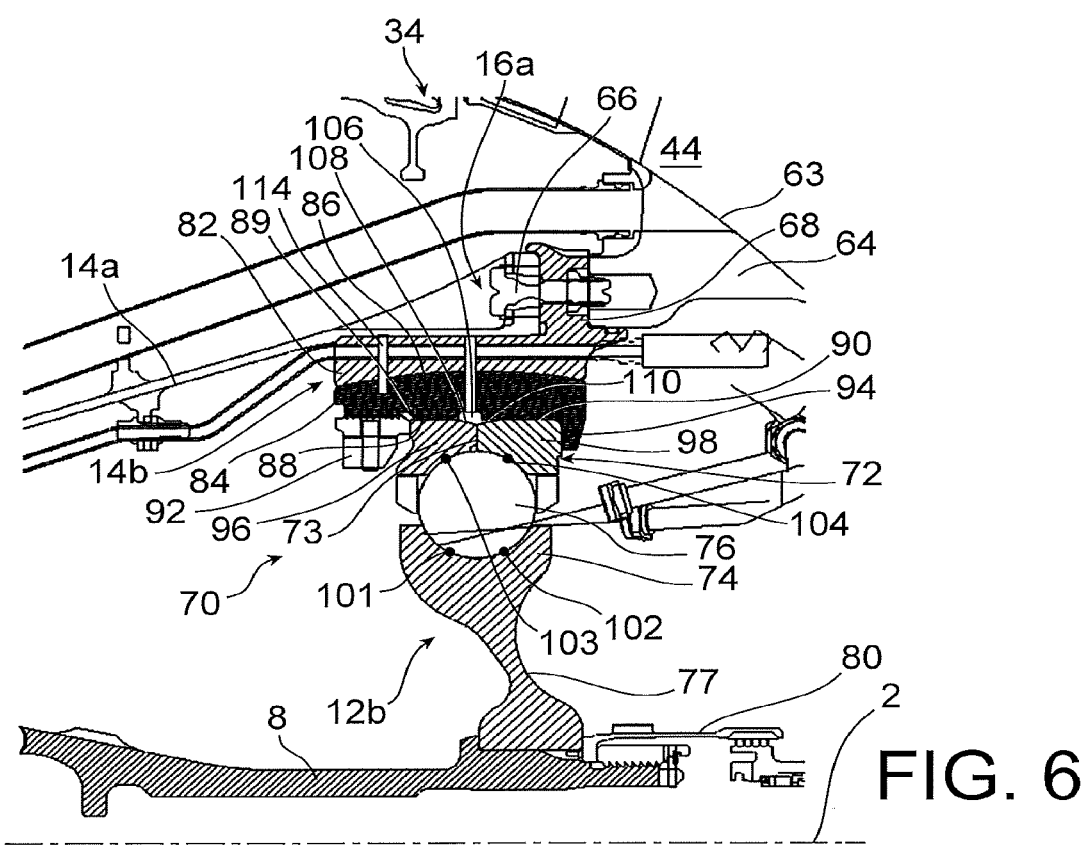
FIG. 6 is an enlarge half-section view of the preceding figure, showing the intermediate rolling-element bearing and its surrounding elements.

Under normal operating conditions of the turbojet, the assembly 70 assumes a configuration shown in FIG. 6, in which four contact points 101, 102, 103, 104 are observed between the rings and the balls. In this configuration, the imbalance is low or nonexistent, so that the shaft is only slightly loaded in bending. Only a slight moment is applied to the shaft 8, which is then transmitted by the rolling-element bearing 12b to the interior annular element 84. However, despite the absence of fusible shear pins at the decoupling interface 86, the interior annular element 84 remains static with respect to the exterior annular element 82 due to high-intensity friction between the surfaces in contact.

In this regard, it is indicated that the assembly 70 could be equipped with means 114 of detecting the relative position between the two elements 82, 84. These means 114, easily installed at the decoupling interface 86, would allow in particular ensuring the absence of relative movement between the two elements 82, 84 apart from extreme situations such as the loss of a fan blade.

Figure 7:
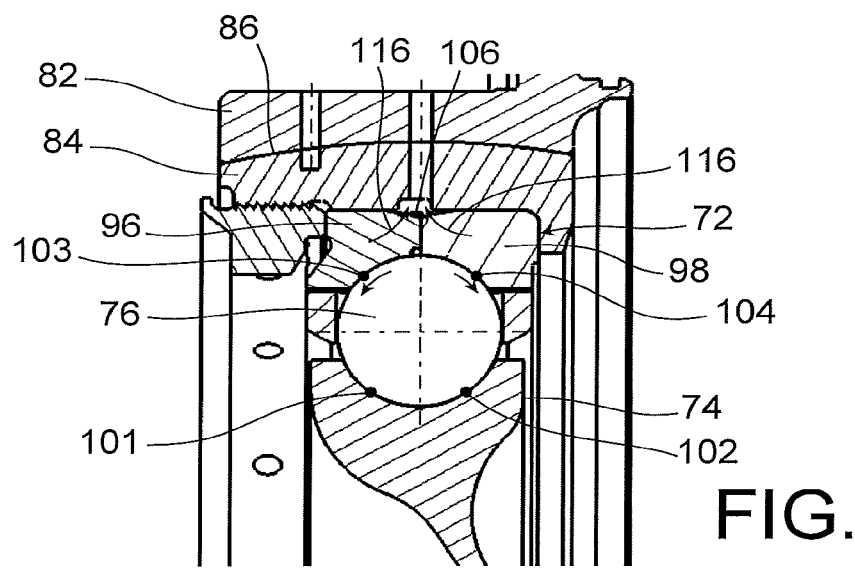
FIG. 7 is a half-section view substantially similar to the preceding figure, showing the intermediate rolling-element bearing in the case of a high radial load.
Figure 8:
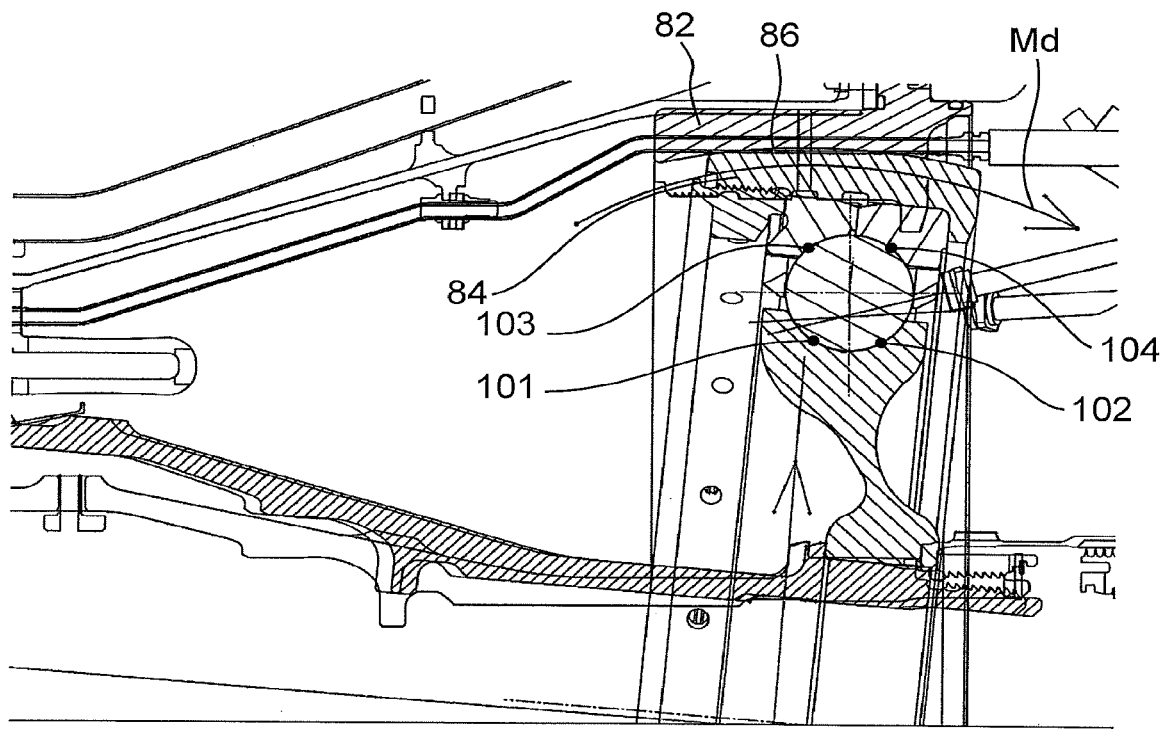
FIG. 8 is a half-section view similar to that of FIG. 5, after mechanical decoupling following the loss of a fan blade.

On the other hand, in the event of an exceptional problem leading to the loss of one or more fan blades, the calibrated screws 66 are designed to break due to the observed imbalance. This implies that the front rolling-element bearing 12a is not correctly guided by the support 14a. During this decoupling of the front rolling-element bearing 12a, bending is created in the drive shaft 8, and hence a decoupling moment which is transmitted by this shaft to the rolling-element bearing 12b, which then undergoes not only the decoupling moment but also considerable radial loads. As illustrated in FIG. 7, the radial loads allow deformation of the exterior ring, the two rings of which, 96, 98 have a tendency to undergo movement comparable to pivoting with respect to the central portion 73, thus causing a kind of closure or squeezing of the exterior ring 72. This deformation, shown schematically by the arrows 116 and made possible by the hollowed space 106 which fills as the deformation progresses, has as its consequence a separation of the two contact points 103, 104 between the balls 76 and the two rings 96, 98. Thanks to this separation of two points of contact 103, 104, the angular stiffness of the rolling-element bearing 12b is increased. The rolling-element bearing 12b becomes capable, in an extremely short period following the fan blade loss, of having a sufficiently high angular stiffness to withstand and transmit the decoupling moment to the interior annular element 84. This causes the movement of the latter with respect to the exterior annular element 82. This desired mechanical decoupling is observed when the decoupling moment Md becomes greater than the moment of the frictional resistance at the decoupling interface 86. At this state, as shown in FIG. 8, the interior annular element 84 has therefore been pivoted with respect to the exterior annular element 82. The dissipated energy resulting from the relative displacement between the two elements 82, 84 guarantees the absence of the transmission of possibly destructive forces within the structure of the turbojet.

It is noted that in this embodiment, decoupling at the two rolling element bearings 12a, 12b occurs extremely rapidly and substantially simultaneously. However, a slight temporal offset can be observed between these two decouplings, in particular when the support 14b of the intermediate rolling-element bearing 12b is not attached to the stator by calibrated fusible screws 66 serving to attach the other support 14a of the front rolling-element bearing 12a.

Of course, various modifications can be applied by a person skilled in the art to the invention which has just been described, solely by way of non-limiting examples.

The invention claimed is:

1. An aircraft turbomachine assembly comprising:
a fan rotor drive shaft;
a rolling-element bearing comprising an exterior ring, an interior ring, and rolling elements arranged between the exterior and interior rings;
means for connecting the interior rolling-element bearing ring to the drive shaft;
a support for the exterior rolling-element bearing ring, said support being designed to be attached to a stator element of the turbomachine, and comprising an interior radial support surface in contact with an exterior radial surface of the exterior ring, the interior and exterior radial surfaces defining a junction interface between the exterior ring and the support,
wherein said support includes an exterior annular element as well as an interior annular element coupled to the exterior annular element via a decoupling interface in the shape of a truncated sphere, the exterior and interior annular elements being configured to be retained with respect to one another by friction at their decoupling interface under normal operating conditions of the turbomachine, and to move with respect to one another in the event of a fan blade loss, under the influence of a decoupling moment originating in the drive shaft and transmitted by the rolling-element bearing which is designed so that each rolling element has two points of contact with the exterior ring and two points of contact with the interior ring, and so that said junction interface has, under normal operating conditions of the turbomachine, a hollowed space for deformation routed around a central portion of the exterior ring.

2. The assembly according to claim 1, wherein said means for connecting the interior rolling-element bearing ring to the drive shaft are made in a single part with the interior ring of the rolling-element bearing.

3. The assembly according to claim 1, wherein the exterior rolling-element bearing ring is split axially into two adjoining rings.

4. The assembly according to claim 1, wherein the exterior radial surface of the exterior ring comprises at a center of the exterior radial surface a notch having a half-section in the shape of a V radially open toward the exterior, delimiting a portion of said hollowed space.

5. The assembly according to claim 3, wherein the exterior radial surface of the exterior ring comprises at a center of the exterior radial surface a notch having a half-section in the shape of a V radially open toward the exterior, delimiting a portion of said hollowed space, the exterior radial surface of each of the two rings has a chamfer, and the two chamfers face one another so as to jointly form said notch.

6. The assembly according to claim 1, wherein said support is equipped with means of detecting the position of the interior annular element with respect to the exterior annular element.

7. The assembly according to claim 1, wherein the rolling elements are balls.

8. An aircraft turbomachine comprising at least one assembly according to claim 1.

9. The turbomachine according to claim 8, further comprising three rolling-element bearings for guiding the fan rotor drive shaft, wherein said rolling-element bearing of the assembly constitutes an intermediate rolling-element bearing situated between the two others.

10. The turbomachine according to claim 8, wherein the fan rotor drive shaft is a low-pressure shaft.

* * * * *